April 2, 1957  N. C. JESSEN  2,787,699
METHOD OF BUTT WELDING FULLY AUSTENITIC
STAINLESS STEEL ALLOY TUBES
Filed April 5, 1954

INVENTOR
*Nicholas C. Jessen*
BY
*J. P. Moran*
ATTORNEY

United States Patent Office 2,787,699
Patented Apr. 2, 1957

2,787,699

METHOD OF BUTT WELDING FULLY AUSTENITIC STAINLESS STEEL ALLOY TUBES

Nicholas C. Jessen, Akron, Ohio, assignor to The Babcock & Wilcox Company, New York, N. Y., a corporation of New Jersey Application April 5, 1954, Serial No. 421,120

12 Claims. (Cl. 219—137)

This invention relates to a novel composite stainless steel tube for use in a welded structure of tubular components, to a novel method of preparing such tube, and to a novel method of butt welding a pair of such tubes without using a permanent backing ring.

A known method of butt welding tubes by fusion welding without the use of a permanent backing ring involves maintaining, inside the tubes aligned for welding, an inert gas such as helium or argon under a slightly superatmospheric pressure. A method of this type has been described in a paper entitled "Controlled Internal Contour Shielded Root Welds Without Backing Rings," by Diehl, Blumbert, and Benz, presented at the 1952 annual meeting of the American Society of Mechanical Engineers, and in other published articles.

In this method, the internal pressure due to the inert gas provides support for the molten metal during welding. The method involves the melting of a certain amount of base metal to provide sufficient filler metal and adequate fusion for the root pass. Consequently, the filler or joint metal of the root pass has the same composition as the base metal (the tubes).

In the manufacture of seamless tubes of chrome-nickel stainless steel, it is essential that the analysis be such as to assure a completely austenitic structure. This can conveniently be effected by adjusting the analysis to have an excess of nickel relative to the chromium content. The excess nickel assures a fully austenitic structure, thus providing satisfactory properties for piercing.

However, in making fusion welds between components formed of stainless steel in the 18Cr-8Ni group, it is essential, in order to assure a sound welded joint, that the weld metal contain a limited amount of ferrite. Fully austenitic welds are subject to fissuring, cracking, etc. Thus, welds made between fully austenitic 18Cr-8Ni tubes, by the method discussed above, are unsatisfactory as the root pass, at least, being composed of the tube metal, is fully austenitic.

In accordance with the present invention, at least partially ferritic welds between fully austenitic tubes are made by first building up fusion weld deposits of partially ferritic weld metal on the tube ends, and then butt welding these deposits by a welding method involving the use of inert gas at superatmospheric pressure inside the tubes to support molten or liquid weld or base metal.

Thus, the invention provides for the formation of a composite tube comprising a fully austenitic Cr-Ni-Cb alloy steel tube having on at least one end a congruent annular weld deposit of partially ferritic Cr-Ni-Cb alloy steel. The tube is formed by inserting, into the tube end, a generally cylindrical plug of Cr-Ni-Cb steel having a circumferential recess. The inner end of this recess is aligned with the tube end and then the recess is over-filled with partially ferritic Cr-Ni-Cb alloy steel by metallic arc welding using reverse polarity, the deposit being fused to the tube end. The plug and deposit are then machined (drilled)out to the I. D. of the tube, and the deposit ground down to the O. D. of the tube.

To butt weld a pair of these composite tubes, the built up ends are abutted against opposite sides of a ring of partially ferritic Cr-Ni-Cb alloy steel having the O. D. of the composite tube. The built up ends are then fusion weld united by a welded joint including the ring and partially ferritic Cr-Ni-Cb alloy steel as a filler metal. This welding is effected by inert gas shielded tungsten arc welding utilizing straight polarity.

During the butt welding of the tube ends, an atmosphere of inert gas at superatmospheric pressure is maintained within the tubes to support molten weld or base metal, thus dispensing with a permanent backing ring.

For an understanding of the invention principles, reference is made to the following description of a typical embodiment thereof as illustrated in the accompanying drawings.

Figure 1:
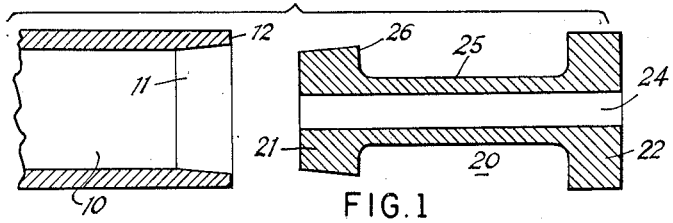
Fig. 1 is an axial sectional view of the tube and plug before being assembled.
Figure 2:
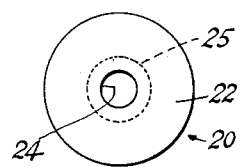
Fig. 2 is an outer end elevation view of the plug.
Figure 4:
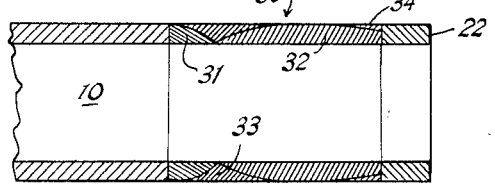
Fig. 4 is a similar view after machining.

The invention is particularly applicable to the butt welding of small diameter, thin wall tubes of AISI Type 347 stainless alloy steels. Referring to Figs. 1 through 4, a tube of this type is illustrated at 10 as having an inner surface 11 at one end bevelled at an angle of 2.5° for a distance inward of the order of ⅛", tube 10 being a 1" O. D. tube with a wall thickness of 0.085". In the particular illustration, tube 10 is a tube pierced from a fully austenitic AISI Type 347 stainless alloy steel including 18Cr-8Ni-Cb.

Surface 11 is arranged to have a tight fit with the frusto-conical end 21 of a generally cylindrical or tubular plug 20, end 21 with outer end 22 defining the axially spaced ends of a circumferential recess 25 in plug 20. For fitting surface 11, end 21 is ⅛" long, and its outer surface 23 is tapered at an angle of 2½°. Cylindrical outer end 22 is somewhat larger in diameter than frusto-conical inner end 21, and the radial depth of recess 25 is substantially greater than the wall thickness of tube 10. To facilitate its later removal by machining, plug 20 has an axial passage 24 therethrough.

Plug 20 is cast from an alloy steel welding rod having the following analysis, and then finished by machining:

| | Percent |
|---|---|
| C | 0.08 |
| Cr | 19.0–21.0 |
| Ni | 7.5–8.5 |
| Mn | 1.25–1.75 |
| Si | 0.50 |
| S | 0.03 |
| P | 0.03 |
| Cb | 10 times C |

Plug 20 is assembled into tube 10 with wall 26 of recess 25 flush with the end surface 12 of tube 10. Recess 25 is then overfilled with a fusion weld deposit 30 by depositing weld metal therein by metallic arc welding. The weld metal is deposited in recess 25 from a ³⁄₃₂" coated welding rod 35, using reverse polarity. Rod 35 is an AISI Type 347 stainless alloy steel including 19Cr-9Ni-Cb.

Figure 3:
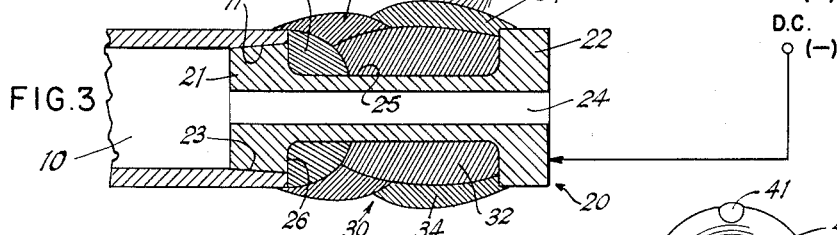
Fig. 3 is an axial sectional view of the composite tube at the end of the build-up operation.

The welding sequence involves the sequential deposition of four welding beads, 31, 32, 33 and 34, as best seen in Fig. 3. After formation of built up weld deposit 30, plug 20 is drilled out to the I. D. of tube 10 and the outer surface of the deposit 30 ground down to the O. D. of tube 10, resulting in the composite tube shown in axial section in Fig. 4.

Figure 5:
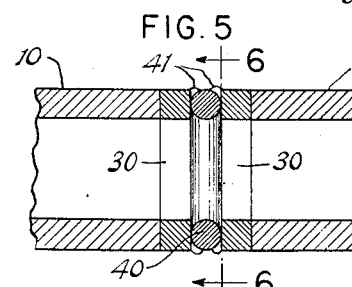
Fig. 5 is an axial sectional view of a pair of the composite tubes arranged for butt welding in end-to-end relation.

The built up ends 30 of a pair of tubes 10 to be butt welded are first machined to remove all except ¼ of the annular congruent weld deposits 30, as may be seen in Fig. 5. The built up ends 30 are then abutted against opposite sides of a ring 40 of the same composition as weldrod 35 and formed to the O. D. of tube 10, the assembly being positioned in a suitable jig (not shown). Before assembly, ring 40 is cleaned in 50% hydrochloric acid at 140° F.

Figure 6:
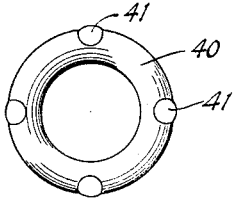
Fig. 6 is a diametric sectional view on the line 6—6 of Fig. 5.
Figure 7:
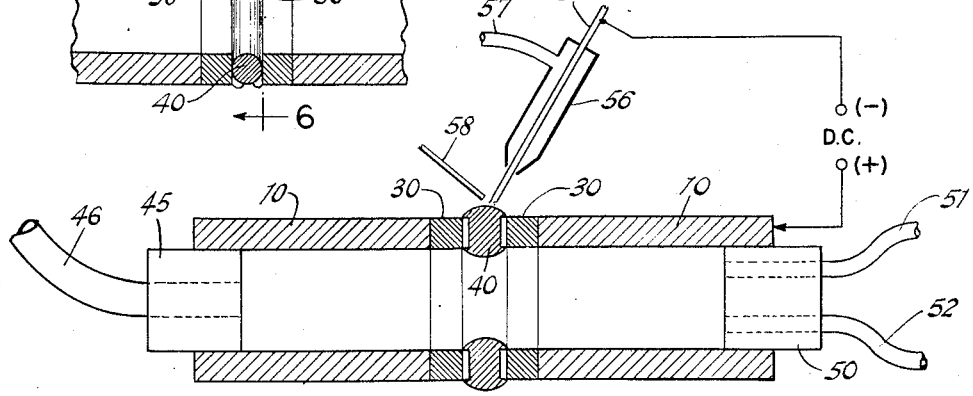
Fig. 7 is an axial sectional view of the tubes illustrating the butt welding operation.

Referring to Figs. 5, 6 and 7, a singly apertured rubber stopper 45 is placed in the outer end of one tube 10, and a dually apertured rubber stopper 50 is placed in the outer end of the other tube 10. The aperture in stopper 45 is connected by a hose 46 to a source of inert gas, such as argon or helium, under superatmospheric pressure. Two hoses, 51 and 52 are connected to stopper 50, exhaust hose 51 being provided with a suitable valve or clamp (not shown) and pressure hose 52 being connected to a manometer (not shown).

With exhaust hose 51 open, the inert gas is supplied to hose 46 and allowed to flow through the assembly for about one minute to purge the interior of the assembly of air. Exhaust hose 51 is then shut off to an extent to raise the manometer pressure to 1.25" of water, maintaining in the assembly interior an atmosphere of inert gas at superatmospheric pressure. Ring 40 is then tack welded to each deposit 30 by four tack welds 41 as best seen in Figs. 5 and 6.

The tubes 10 are then weld united by a welded joint including ring 40, the welding being effected by inert gas shielded tungsten arc welding using straight polarity. A tungsten electrode 55 is schematically illustrated in Fig. 7 as extending through a tubular nozzle 56 connected by a pipe or conduit 57 to a source of inert gas under pressure, such as helium or argon, to deliver an annular stream of inert gas around the arcing end of electrode 55 and blanketing the welding operation. Filler metal is added from a rod or wire 58, which is a 3/32" cold drawn wire of AISI Type 347 stainless alloy steel of a composition such as to deposit weld metal with a ferrite content of 3% to 8%.

Figure 8:
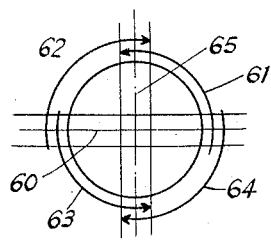
Fig. 8 is a diagram of the welding sequence used in the butt welding.

The welding sequence is as indicated in Fig. 8. As indicated by arrow 61, the weld is started ⅛" below the horizontal centerline 60 and continued to ⅛" past the vertical centerline 65, with filler rod 58 at right angles to the welding torch. This weld is then water cooled to body temperature. The same procedure is then followed in making the second weld on the opposite side of the tube, as indicated by arrow 62.

Next, the assembly is rotated 180° about its axis, and the weld indicated by arrow 63 is formed and cooled in the same manner. The final weld, indicated by arrow 64 is then made and cooled as described.

While a specific embodiment of the invention has been shown and described in detail to illustrate the application of the invention principles, it will be understood that the invention may be embodied otherwise without departing from such principles.

What is claimed is:

1. A method of butt welding fully austenitic Cr-Ni alloy steel tubes comprising the steps of building up, on the ends of the tubes to be weld united, fusion weld deposits of partially ferritic Cr-Ni alloy steel; weld uniting the built up ends of axially aligned tubes with a fusion weld joint of partially ferritic Cr-Ni alloy steel; and maintaining an atmosphere of inert gas under super atmospheric pressure inside said tubes while weld uniting the same.

2. A method as claimed in claim 1 in which said tubes are 18Cr-8Ni-Cb alloy steel and said weld deposits are 19Cr-9Ni-Cb alloy steel.

3. A method as claimed in claim 2 in which said welded joint has a ferrite content of from 3% to 8%.

4. A method as claimed in claim 1 in which the weld deposits are formed by metallic arc welding, and the welded joint is formed by inert gas shielded tungsten arc welding.

5. A method as claimed in claim 1 in which the weld deposits are formed by metallic arc welding utilizing reverse polarity, and the welded joint is formed by inert gas shielded tungsten arc welding utilizing straight polarity.

6. A method of butt welding fully austenitic Cr-Ni alloy steel tubes comprising the steps of building up, on the ends of the tubes to be weld united, fusion weld deposits of partially ferritic Cr-Ni alloy steel; abutting a pair of such weld deposits in axial alignment against opposite sides of a ring of partially ferritic Cr-Ni alloy steel having an outside diameter substantially equal to that of the tubes; forming a welded joint between such weld deposits, and including said ring, by fusion welding using a filler of partially ferritic Cr-Ni alloy steel; and maintaining an atmosphere of inert gas under super atmospheric pressure inside said tubes while weld uniting the same.

7. A method as claimed in claim 6 in which the weld deposits are formed by metallic arc welding utilizing reverse polarity, and the welded joint is formed by inert gas shielded tungsten arc welding utilizing straight polarity.

8. A method as claimed in claim 6 in which said tubes are 18Cr-8Ni-Cb alloy steel and said weld deposits are 19Cr-9Ni-Cb alloy steel.

9. A method as claimed in claim 8 in which said welded joint has a ferrite content of from 3% to 8%.

10. A method as claimed in claim 9 in which the weld deposits are formed by metallic arc welding utilizing reverse polarity, and the welded joint is formed by inert gas shielded tungsten arc welding utilizing straight polarity.

11. A method of preparing a fully austenitic Cr-Ni alloy steel tube for butt welding to a similar tube comprising the steps of inserting a circumferentially recessed generally cylindrical plug into an end of the tube with the axially inner end of the recess substantially flush with the end of the tube; over filling said recess with a fusion weld deposit joined to the end of the tube and comprising partially ferritic Cr-Ni alloy steel; and machining out said plug and weld deposit to the internal diameter of the tube to leave, on the tube end, a built up weld deposit of partially ferritic Cr-Ni alloy steel.

12. A method as claimed in claim 11 in which the weld deposit is formed by metallic arc welding utilizing reverse polarity.

References Cited in the file of this patent

UNITED STATES PATENTS

| | | |
|---|---|---|
| 2,060,765 | Welch | Nov. 10, 1936 |
| 2,111,790 | Larson | Mar. 22, 1938 |
| 2,122,994 | Southgate | July 5, 1938 |
| 2,179,774 | Zerbe | Nov. 14, 1939 |
| 2,233,455 | Larson | Mar. 4, 1941 |
| 2,240,672 | Scherer | May 6, 1941 |
| 2,496,188 | Wiese | Jan. 31, 1950 |
| 2,555,256 | Tyson | May 29, 1951 |